(12) United States Patent
Arad et al.

(10) Patent No.: US 8,199,769 B2
(45) Date of Patent: Jun. 12, 2012

(54) TIMESLOT SCHEDULING IN DIGITAL AUDIO AND HYBRID AUDIO RADIO SYSTEMS

(75) Inventors: Oren Arad, Palo Alto, CA (US);
Sridhar Sharma, Milpitas, CA (US);
Shay Waxman, Sunnyvale, CA (US);
David Bydeley, San Jose, CA (US)

(73) Assignee: Siport, Inc., Santa Clara, CA (US)

( * ) Notice: Subject to any disclaimer, the term of this patent is extended or adjusted under 35 U.S.C. 154(b) by 821 days.

(21) Appl. No.: 12/154,882

(22) Filed: May 27, 2008

(65) Prior Publication Data

US 2008/0291857 A1 Nov. 27, 2008

Related U.S. Application Data

(60) Provisional application No. 60/931,703, filed on May 25, 2007, provisional application No. 60/931,741, filed on May 25, 2007.

(51) Int. Cl.
*H04L 12/43* (2006.01)
(52) U.S. Cl. ...................................................... 370/459
(58) Field of Classification Search .................... None
See application file for complete search history.

(56) References Cited

U.S. PATENT DOCUMENTS

| | | | |
|---|---|---|---|
| 4,710,747 A | 12/1987 | Holland | |
| 4,761,644 A | 8/1988 | Kawai et al. | |
| 4,910,752 A | 3/1990 | Yester, Jr. et al. | |
| 5,140,698 A | 8/1992 | Toko | |
| 5,155,479 A | 10/1992 | Ragan | |
| 5,325,088 A | 6/1994 | Willard et al. | |
| 5,555,183 A | 9/1996 | Willard et al. | |
| 5,640,670 A | 6/1997 | Samueli et al. | |
| 5,654,952 A | 8/1997 | Suzuki | |
| 5,870,439 A | 2/1999 | Ben-Efraim et al. | |
| 5,920,824 A | 7/1999 | Beatty et al. | |
| 6,031,827 A * | 2/2000 | Rikkinen et al. | .............. 370/330 |
| 6,057,795 A | 5/2000 | Suzuki | |
| 6,072,784 A | 6/2000 | Agrawal et al. | |
| 6,205,225 B1 | 3/2001 | Orban | |
| 6,219,333 B1 | 4/2001 | Ahn | |
| 6,232,905 B1 | 5/2001 | Smith et al. | |
| 6,259,681 B1 | 7/2001 | Kolev et al. | |
| 6,286,122 B1 | 9/2001 | Alanara | |
| 6,311,048 B1 | 10/2001 | Loke | |
| 6,317,065 B1 | 11/2001 | Raleigh | |

(Continued)

FOREIGN PATENT DOCUMENTS

JP 2007-243504 9/2007

*Primary Examiner* — Raj Jain
(74) *Attorney, Agent, or Firm* — Carr & Ferrell LLP

(57) ABSTRACT

Systems and methods of decoding data streams and conserving power are described. In some embodiments, a stream of data containing audio and other data is divided into a plurality of timeslots. A first timeslot of the plurality of timeslots is allocated to a first service. A grant location message which indicates a location of the first timeslot allocated to the first service is generated. The grant allocation message and the plurality of timeslots are transmitted to a receiver.

The receiver may receive and decode the grant allocation message to identify OFDM symbols that carry information regarding the first service. The receiver may also receive the plurality of timeslots. The receiver may set a power mode of a component during OFDM symbols that indicate a status of the first service.

19 Claims, 13 Drawing Sheets

U.S. PATENT DOCUMENTS

| | | |
|---|---|---|
| 6,405,062 B1 | 6/2002 | Izaki |
| 6,405,602 B1 | 6/2002 | Itou et al. |
| 6,407,689 B1 | 6/2002 | Bazarjani et al. |
| 6,438,364 B1 | 8/2002 | Waite |
| 6,466,913 B1 | 10/2002 | Yasuda |
| 6,504,863 B1 | 1/2003 | Hellmark |
| 6,654,595 B1 | 11/2003 | Dexter |
| 6,671,371 B1 | 12/2003 | McNeill et al. |
| 6,693,953 B2 | 2/2004 | Cox et al. |
| 6,754,763 B2 | 6/2004 | Lin |
| 6,763,240 B1 | 7/2004 | Chambers |
| 6,765,931 B1 | 7/2004 | Rabenko et al. |
| 6,819,274 B2 | 11/2004 | Krone et al. |
| 6,862,325 B2 | 3/2005 | Gay-Bellile et al. |
| 7,006,617 B1 | 2/2006 | Del Farra |
| 7,127,008 B2 | 10/2006 | Kroeger |
| 7,205,923 B1 | 4/2007 | Bahai |
| 7,233,275 B2 | 6/2007 | Aksin et al. |
| 7,295,812 B2 | 11/2007 | Haapoja et al. |
| 7,299,021 B2 | 11/2007 | Pärssinen et al. |
| 7,302,013 B2 | 11/2007 | Samueli et al. |
| 7,369,989 B2 | 5/2008 | Absar |
| 7,480,689 B2 | 1/2009 | Song |
| 7,512,743 B2 | 3/2009 | Tom et al. |
| 7,555,661 B2 | 6/2009 | Luu |
| 2002/0067825 A1 | 6/2002 | Baranowski et al. |
| 2002/0126778 A1 | 9/2002 | Ojard |
| 2002/0169009 A1 | 11/2002 | Reiner |
| 2003/0078007 A1 | 4/2003 | Parssinen et al. |
| 2003/0159076 A1 | 8/2003 | Delisle |
| 2004/0080675 A1 | 4/2004 | Hoshino |
| 2004/0145508 A1 | 7/2004 | Gulati et al. |
| 2004/0203537 A1 | 10/2004 | Yoshida et al. |
| 2004/0223449 A1 | 11/2004 | Tsuie et al. |
| 2005/0047488 A1 | 3/2005 | Sugahara |
| 2005/0081245 A1 | 4/2005 | Arad et al. |
| 2005/0094036 A1 | 5/2005 | Tichelaar |
| 2005/0094840 A1 | 5/2005 | Harano |
| 2005/0113136 A1 | 5/2005 | Gosieski, Jr. |
| 2005/0239518 A1 | 10/2005 | D'Agostino et al. |
| 2006/0001779 A1 | 1/2006 | Favrat et al. |
| 2006/0003729 A1 | 1/2006 | Tuttle et al. |
| 2006/0082690 A1 | 4/2006 | Englert |
| 2006/0112157 A1 | 5/2006 | Song |
| 2006/0141974 A1 | 6/2006 | Campbell et al. |
| 2006/0195498 A1 | 8/2006 | Dobbek |
| 2006/0212503 A1 | 9/2006 | Beckmann |
| 2007/0080800 A1 | 4/2007 | Carbone et al. |
| 2007/0105576 A1* | 5/2007 | Gupta et al. ............. 455/509 |
| 2007/0112901 A1 | 5/2007 | Niktash |
| 2007/0176816 A1 | 8/2007 | Wood |
| 2008/0097764 A1 | 4/2008 | Grill |
| 2009/0198753 A1 | 8/2009 | Benjelloun Touimi |

* cited by examiner

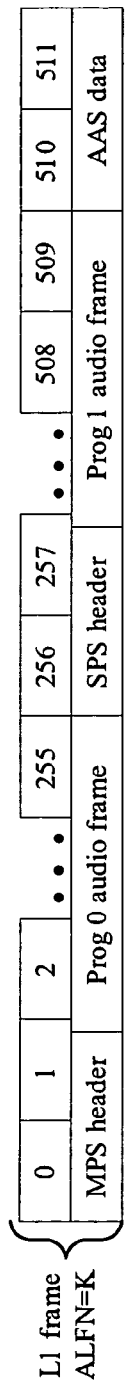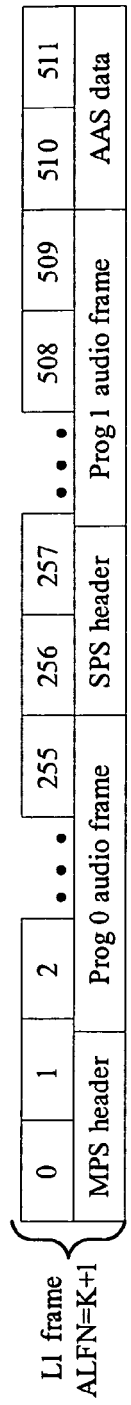 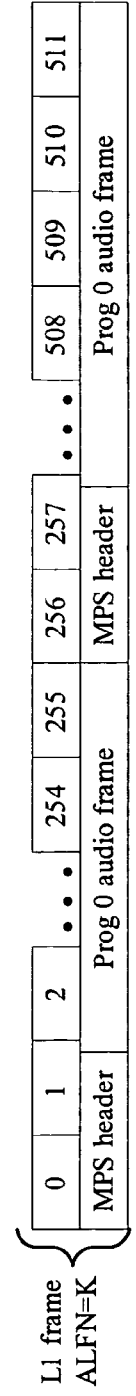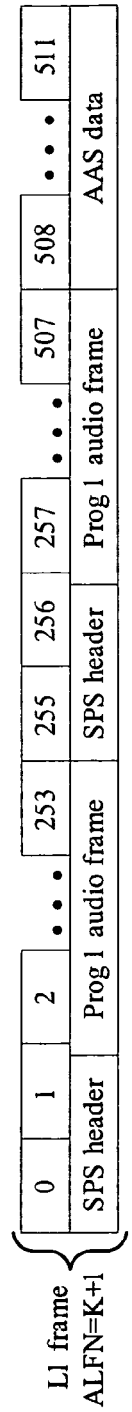
Prior Art
FIG. 5
FIG. 6

TIMESLOT SCHEDULING IN DIGITAL AUDIO AND HYBRID AUDIO RADIO SYSTEMS

CROSS-REFERENCE TO RELATED APPLICATIONS

This application claims the benefit of U.S. provision application No. 60/931,703, filed May 25, 2007, and entitled "System and Methods for Adding Timeslot Scheduling and Notifications to a NRSC-5 transmission system," which is incorporated herein by reference. This application is related to U.S. provision application No. 60/931,741, filed May 25, 2007, and entitled "NRSC-5 Radio Receiver Apparatus with Power Control," which is incorporated herein by reference.

BACKGROUND OF THE INVENTION

1. Field of the Invention

Embodiments of the present invention relate generally to radio systems and, more particularly, to digital audio and hybrid radio systems.

2. Background Art

National Radio Standards Committee-5 (NRSC-5) and National Radio Standards Committee-5A (NRSC-5A) are standards for hybrid digital (HD™) radio which is becoming increasingly ubiquitous. NRSC-5 and NRSC-5A compatible receivers may be deployed in a variety of products such as car radios, portable radios, MP3 players, cell phones, and navigation devices. For many of these products it is highly desirable for the receiver to consume as little power as possible in order to conserve the power life of a device battery.

SUMMARY OF THE INVENTION

Systems and methods of decoding data streams (e.g., timeslot scheduling) and power conservation are described. In some embodiments, a stream of data containing audio and other data is divided into a plurality of timeslots. A first timeslot of the plurality of timeslots is allocated to a first service. A grant allocation message which indicates a location of the first timeslot allocated to the first service is generated. The grant allocation message and the plurality of timeslots are transmitted to a receiver.

The receiver may receive and decode the grant allocation message to identify orthogonal frequency division multiplexing (OFDM) symbols that carry information regarding the first service. The receiver may also receive the plurality of timeslots. The receiver may set a power mode of a component during OFDM symbols that indicate a status of the first service.

An exemplary system comprises a transmission system and a transmitter. The transmission system may be configured to divide a stream of data into a plurality of timeslots, to allocate a first timeslot of the plurality of timeslots to a first service, and to generate a grant allocation message that indicates a location of the first timeslot allocated to the first service. The transmitter may be configured to transmit the grant allocation message and the plurality of timeslots to a receiver.

An exemplary system may also comprise a tuner and digital signal processing hardware. The tuner may be configured to receive a grant allocation message and a plurality of timeslots. The digital signal processing hardware may be configured to decode the grant allocation message to identify OFDM symbols that carry information regarding a first service and set a power mode of a component of the tuner during OFDM symbols that indicate a status of the first service.

BRIEF DESCRIPTION OF THE DRAWINGS

FIG. 5 depicts the current NRSC-5A transmission standard provision for scheduling multiple audio services in a single P1 logical channel in the prior art.

FIG. 6 shows improved scheduling in accordance with an exemplary embodiment.

DETAILED DESCRIPTION OF EXEMPLARY EMBODIMENTS

The audio system described herein may be an audio system that performs based on an NRCS-5 standard. The NRCS-5 standard describes a digital radio frequency broadcast system that may deliver digital audio and data services to radio receivers from terrestrial transmitters on existing Frequency Modulation (FM) and Amplitude Modulation (AM) radio. The system identified in NRSC-5, NRSC-5A, and other Ibiquity standard documents uses an in-band over channel (IBOC) OFDM technology to carry digital data streams over AM and FM bands. This system allows for a coexistence of digital modulated signals alongside a legacy analog FM and AM transmission. This system can also provide several services in a single frequency band, such as multiple audio streams and data services.

A compatible radio receiver is constantly active. However, the compatible radio receiver may consume less power by switching off (e.g., deactivating) or otherwise reducing power to components unrelated to active services. The current transmission system, however, does not provide a method to allocate different services in a logical channel to different times of data transmission (i.e., timeslots). As a result, a radio receiver may need to receive and decode an entire stream of bits belonging to a logical channel in order to extract information needed for any service in use.

In various embodiments, an extended transmission system allocates different services in the logical channel to different timeslots. Information regarding this allocation may be sent to a receiver thereby giving the receiver time to reduce or eliminate power to one or more components of the tuner (or any other components) related to inactive services. Further, based on the information regarding allocation, the compatible receiver may activate or "wake up" inactive components, or those components in standby mode, prior to their use in newly active services. Those skilled in the art will appreciate that existing receivers may need to be reconfigured or updated in order to receive and process the information regarding the allocation.

Figure 1:
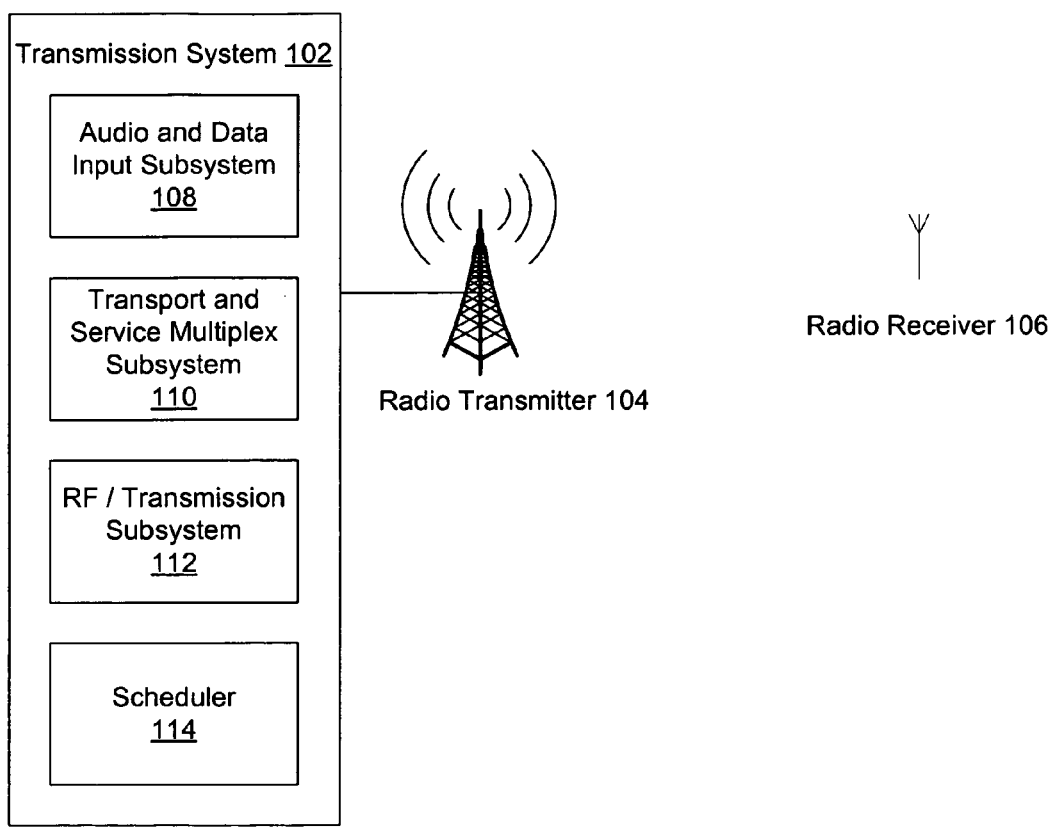
FIG. 1 is a diagram illustrating an overview of a transmission system in an exemplary embodiment.

FIG. 1 is a diagram illustrating an overview of a transmission system 102 in an exemplary embodiment. The transmission system 102 transmits data over the radio transmitter 104 to the radio receiver 106. The exemplary transmission system 102 can be partitioned into three subsystems including an audio and data input subsystem 108, a transport and service multiplex subsystem 110, a radio frequency (RF)/transmission subsystem 112, and a scheduler 114.

The exemplary audio and data input subsystem 108 provides for the encapsulation of audio streams and data streams into packets that can be sent over the transmission system 102. The audio streams in the transmission system 102 include a primary audio stream as well as one or more secondary audio streams. In some cases, a source (e.g., broadcaster) for the primary audio stream may transmit a duplication of the primary audio stream over a purely analog signal. It is not uncommon, however, for the source of one or more of the secondary audio streams to include audio content not available in an analog broadcast signal. The audio and data input subsystem 108 may compress the digital audio source streams within an audio transport layer and send the compressed digital audio source streams to a transport multiplex (e.g., the transport and service multiplex subsystem 110).

The digital data within the audio stream may comprise several different stream types, including program service data (PSD), station information service (SIS) data, and advanced data services (ADS). PSD can provide information on an audio program that may be heard by a radio listener. For example, PSD may include a song title, an artist name, album information, a genre, a comment, a commercial, and/or reference identifiers.

SIS data provides general information about a station's program as well as some technical information. For example, SIS data may include a station identification number, station call letters, a station name, a station location, a station time, and/or a text message.

ADS may include broadcast data services that carry content that can be expressed as a data file or a data stream, including audio services. For example, such services may include presentations of stock, news, weather, real time traffic, and entertainment programming including audio, text, and images.

The transmission system 102 transmits one or more logical channel streams. Each logic channel stream may include one or more audio or data services. The exemplary transport and service multiplex subsystem 110 takes multiple audio and data input streams and organizes these streams into packets. A service multiplex arranges the packets from one or more services into a logical channel stream.

The RF/transmission subsystem 112 receives the logical channel streams from the transport and service multiplex subsystem 110 and performs channel coding and waveform generation. The RF/transmission subsystem 112 may transmit a signal of the processed streams at a radio frequency over the radio transmitter 104. Each logical channel stream may be independently coded using a convolutional encoder, then interleaved and modulated using orthogonal frequency division multiplexing (OFDM). Further, each logical stream may be assigned with a group of tones that carries the information within the stream. Those skilled in the art will appreciate that the RF/Transmission subsystem 112 may use OFDM as well as coded orthogonal frequency division multiplexing (COFDM).

The scheduler 114 divides a continuous data transmission into a sequence of timeslots. In one example, the scheduler 114 divides data received from the transport and service multiplex subsystem 110 and provides the timeslots to the RF/transmission subsystem 112. In other embodiments, the scheduler 114 divides data received from the RF/transmission subsystem 112 and provides the timeslots to the RF/transmission subsystem 112 for transmission.

The scheduler 114 may allocate timeslots or portions of timeslots to different services carried over a single physical channel ahead of the time of the actual transmission. The scheduler 114 may then send bandwidth allocation messages informing receivers (e.g., radio receiver 106) about allocation of services into timeslots. In some embodiments, the scheduler 114 may implement a bandwidth allocation algorithm that attempts to create large gaps between timeslots that are allocated to data from the same service. The scheduler 114 is further described in FIG. 2.

The radio receiver 106 (e.g., an HDradio™ receiver) may receive the signal from the radio transmitter 104 and then down-convert the signal from a radio frequency to an intermediate frequency. The down-converted signal may then be sampled and digitally demodulated to produce a stream of bits belonging to one or more logical channels. The radio receiver 106 may then de-multiplex the logical channel bits to extract bits belonging to the service that a radio receiver 106 is currently providing to a user.

In a typical usage model, the user of the radio receiver 106 will only use a single service out of several services that a channel may provide. Various components (e.g., circuits or combinations of circuits) within the radio receiver 106 may be required to implement various services. However, if the service is not in use, one or more components may be deactivated (i.e., set to power down mode) or placed in power standby mode where power to those unused components is reduced or completely eliminated.

Although only one radio receiver 106 is depicted in FIG. 1, those skilled in the art will appreciate that any number of radio receivers 106 may receive transmissions from the radio transmitter 104. Similarly, any number of radio transmitters 104 including radio transmitters 104 that are not in direct communication with a transmission system (e.g., transmission system 102) may transmit to one or more radio receivers 106. Further, although only one transmission system 102 and only one radio transmitter are depicted in FIG. 1, there may be any number of transmission systems 102 and any number of radio transmitters 104.

Figure 2:
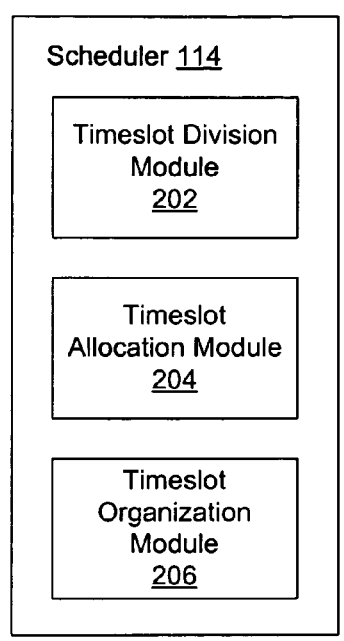
FIG. 2 is a block diagram of an exemplary scheduler in an exemplary embodiment.

FIG. 2 is a block diagram of an exemplary scheduler 114 in an exemplary embodiment. The scheduler 114 includes a timeslot division module 202, a timeslot allocation module 204, and an optional timeslot organization module 206. A module may be hardware, software, or a combination of hardware and software.

In various embodiments, a common timeline is defined between the transmission system 102 and the radio receiver 106. The timeslot division module 202 may partition the timeline into a sequence of timeslots. The timeslot division module 202 then assigns a position identification index to each timeslot. In one example, the position identification index is unique and may be identified by both the transmission system 102 and the radio receiver 106.

In various embodiments, the timeslot division module 202 defines the timeline by coarse time intervals which are then further divided into timeslots. In one example, the coarse time intervals may be set by an Absolute Layer 1 Frame Number (ALFN). The timeslots may be aligned to OFDM symbol numbers that carry data in the physical layer (L1) transmission frame. The L1 transmission frame has 512 OFDM symbols in the FM mode and 256 OFDM symbols in the AM mode. Any timeslot can thereby be identified by both the radio receiver 106 and the transmission system 102 by using a 41 bit timestamp comprising a 32 bit count that identifies the ALFN of the L1 transmission frame and an additional 9 bit count that identifies the (OFDM Symbol) timeslot number within the L1 transmission frame. The 9 bit count is in a range of 0 to 511 in the FM mode and in a range of 0 to 255 in the AM mode. Those of ordinary skill in the art will realize that there are many ways to define the common timeline and timeslots without departing from the scope and spirit of the exemplary embodiments disclosed herein.

The transmission system 102 may provide sufficient information in the transmission standard for both the transmission system 102 and a radio receiver 106 to establish the common timeline. In one example, the ALFN is transmitted in each L1 transmission frame as a part of the Station Information Service (SIS) messages. The exemplary radio receiver 106 can then decode the SIS messages, thereby getting the 32 bit value of the ALFN belonging to the current received L1 transmission frame. To identify the timeslot number within the L1 transmission frame, the radio receiver 106 may set a count at the first OFDM symbol of the L1 transmission frame, and increment this count for every received OFDM symbol until the end of the L1 transmission frame.

The timeslot allocation module 204 allocates to each service a set of one or more continuous timeslots carrying information bits belonging to the service. A continuous set of one or more timeslots that are allocated to a particular service is defined as a grant.

In various embodiments, the scheduler 114 attempts to maximize the size of a grant while maximizing the gaps between grants. The scheduler 114 may also guarantee a required bandwidth for a service and a maximum allowed latency between grants. The bandwidth and maximum latency required for the different services may be dependant on service type and may vary between different audio services and data services. The bandwidth and maximum latency can be parameters associated with each service that an operator of the transmission system provides in order to guarantee an expected quality of particular services. The optional timeslot organization module 206 creates a gap of timeslots not allocated to the service.

The scheduler 114 may also schedule a periodic grant for fixed bandwidth services such that a service will receive a fixed size grant of Xgrant_size timeslots, once every fixed interval of Xgrant_interval. In some embodiments, the scheduler 114 attempts to make the Xgrant_interval as large as possible without violating the maximum latency requirement for the related service The scheduler 114 may increase the size of each grant (Xgrant_size) to carry more information bits, and then space the grants in time. For example, if a total bandwidth of a logical channel is 25 Kbps and the bandwidth of a specific data service (denoted DS0) is a continuous 1 Kbps and the maximum allowed latency is equal to a duration of 25 L1 transmission frames, the scheduler 114 may allocate Xgrant_size=one L1 transmission frame and Xgrant_interval=25 L1 transmission frames. As a result, a transmission allocation (before interleaving) may comprise one L1 transmission frame carrying data belonging to DS0, followed by 24 L1 transmission frames that do not carry data belonging to DS0, and so forth.

The scheduler 114 may grant timeslots to services before the transmission of the information bits that are carried in the grant. In various embodiments, for fixed bandwidth services, the scheduler 114 can allocate a periodic grant that will be available for service information bit transmission at any time in the future, until the service is stopped, or until the bandwidth for the service is changed.

In some embodiments, the scheduler 114 provides immediate grants of timeslots to services very close to the actual time of transmission. In one example, these grant timeslots accommodate services that are not periodic. Further, the grant timeslots may accommodate services that have varying bandwidth and require very short latency between the time the information is provided to the transmission system 102 until the information is transmitted.

The timeslot allocation module 204 may inform the radio receiver 106 about the grant allocations for different services. In various embodiments, the timeslot allocation module 204 inserts a grant allocation message (GAM) into a stream to be transmitted. The GAM may provide descriptions of the grant allocations to the different services as well as the location of the grants on the common timeline. In one example, a GAM can describe a periodic grant to a single service. In another example, the GAM can describe multiple periodic grants to multiple services. The GAM may carry the following information:
1) Service identification
2) ALFN of first grant belonging to the service
3) Periodicity of grant in L1 transmission frames
4) Index of timeslot or OFDM symbol within the L1 transmission frame of grant start
5) Length of the grant in timeslots
6) ALFN of last grant belonging to the service (may not applicable for a continuous service)

The service identification for audio may use a program number, ranging from 0 to 7. The service identification for data services may also use a port number.

The GAM may indicate allocation for services. Further, the GAM may comprise a single grant, multiple grants, or continuous periodic grants. For example, the GAM can set last_grant_ALFN=first_grant_ALFN. Therefore, validity of the GAM is for only one L1 transmission frame. The GAM may use a special value for a last grant ALFN to indicate continuous periodic grants to a service (e.g., Last_grant_ALFN=0xFFFFFFFF). Further, the GAM can be sent periodically but very infrequently, such that radio receivers may have multiple opportunities to receive the GAM information.

In various embodiments, the GAM can be carried as ADS packets. In such a case, the GAM may have a unique port number. In one example, the GAM, itself, may be carried as part of the ADS packet payload.

In another exemplary embodiment, the GAM can be carried as part of a PIDS logical channel as a new type of SIS PDU. For example, the SIS PDU carrying GAM may use a type field=1 to identify the PDU as a GAM. In some embodiments, several SIS PDU may be concatenated to carry a single GAM message.

Figure 3:
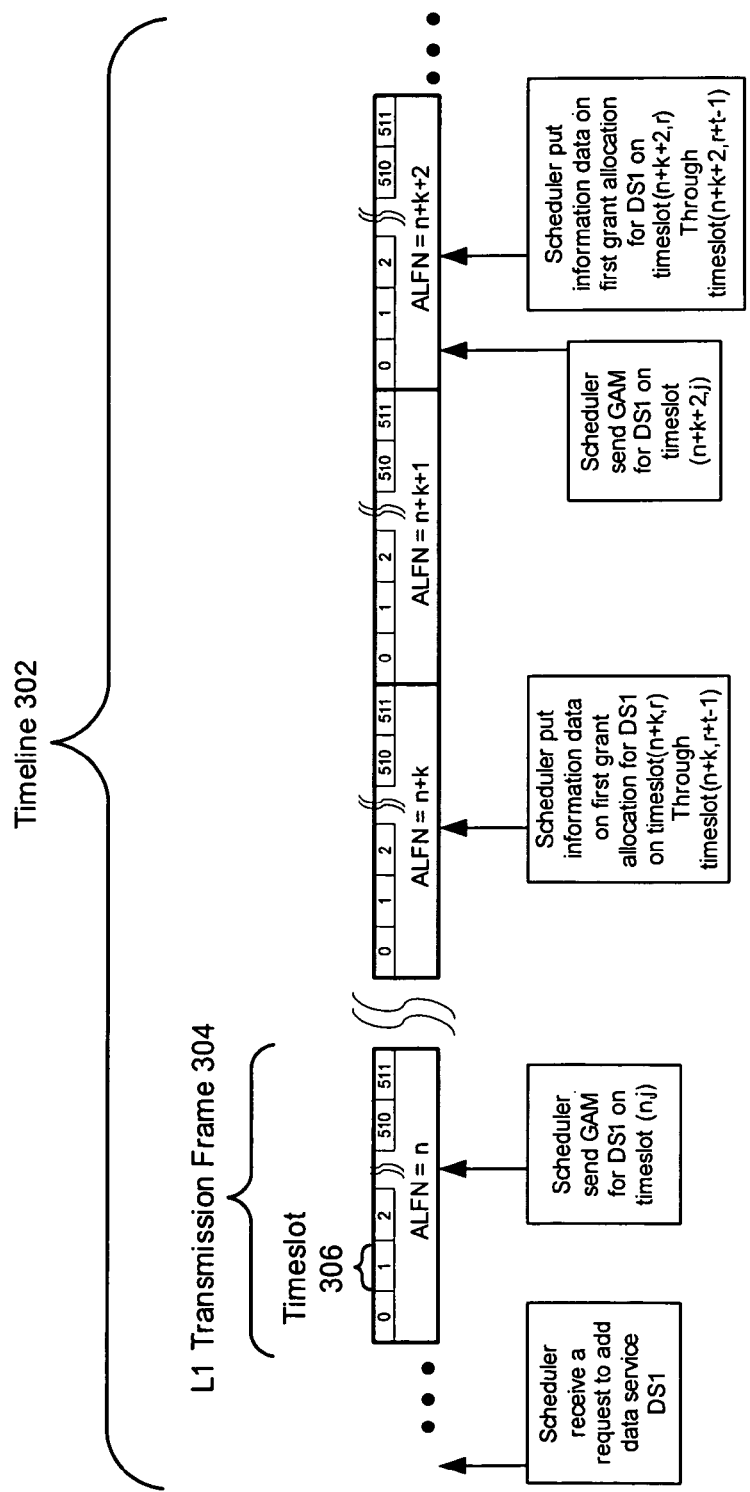
FIG. 3 depicts a sequence of grant scheduling events on a timeline in an exemplary embodiment.

FIG. 3 depicts a sequence of grant scheduling events on a timeline 302 in an exemplary embodiment. The timeline 302 includes L1 transmission frames 304 which each comprise an ALFN and timeslots 306 aligned to OFDM symbols. The L1 transmission frames 304 also include a count ranging from 0 to 511. In various embodiments, the timeslots 306 are uniquely identified by a set of 2 values including the ALFN as well as OFDM count which may be denoted as timeslot (ALFN,OFDM_count).

In various embodiments, the scheduler 114 may receive a request to schedule a new data service denoted as DS1 to a logical channel. The scheduler 114 may also receive the bandwidth and maximum latency for the DS1 service. The maximum latency can be defined in L1 transmission frames 304 and the bandwidth can be expressed in units of timeslots/per frame. In the present example, the maximum latency is 2 L1 transmission frames and the bandwidth is m timeslots/frame. The scheduler 114 may then allocate a periodic grant for DS1 information with a period of 2 L1 transmission frames, not exceeding the maximum latency. Each grant is set to a size of t=2*m timeslots, starting from timeslot index r within the frame, up to timeslot index r+t−1. The scheduler 114 may then send a GAM at timeslot(n,j), to inform radio receiver 106 of the location and period of the DS1 grants. The scheduler 114 may insert additional GAMs periodically, to inform radio receiver(s) which have not received the first GAM.

Those of ordinary skill in the art will realize that there are many ways to implement scheduler functionality, scheduling methods, and GAM protocols without departing from the scope and spirit of the inventive concepts disclosed herein.

In one exemplary embodiment, the grant allocation for all services is a part of NRSC-5 and NRSC-5A layer2 multiplexing. The grant allocation described herein may apply to all main program service (MPS) and supplemental program service (SPS) fixed data and opportunistic data provided by the layer2 multiples, or may apply only to a subset of the streams multiplexed by the layer2. For example, a particular layer2 multiplex may carry MPS, SPS, and fixed data. The scheduler 114 may only address grant allocation for some services in the fixed data transport stream. In these cases, the GAM may only be sent for the fixed data services that are scheduled by the scheduler module.

Further, the multiplexed data from layer2 may go to NRSC-5 (or NRSC-5A) layer1 processing. As a result, the scheduled data as well as all other transmitted data may go through layer1 scrambling, interleaving channel coding, and modulation. After time interleaving at the transmitter, consecutive bits of each timeslot 306 will be spread and transmitted over multiple OFDM symbols. The formula by which each data bit is interleaved in layer1 is well known in the art and may depend on the type of logical channel that carries the information bit.

Figure 4:
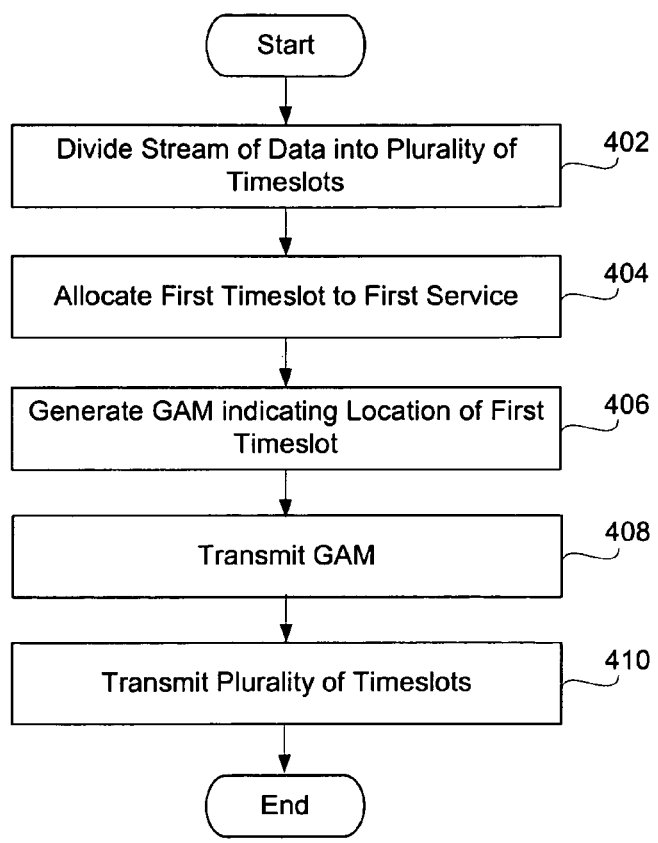
FIG. 4 is a flowchart regarding transmitting a grant allocation message in an exemplary embodiment.

FIG. 4 is a flowchart regarding transmitting GAM in an exemplary embodiment. In step 402, the timeslot division module 202 divides a stream of data into a plurality of timeslots. The stream of data may comprise one or more audio streams as well as other data streams as discussed herein. In one example, the stream of data includes a primary audio stream and a secondary stream. The primary audio stream may transmit a duplication of the primary audio stream over an analog signal. The secondary stream may comprise digital data including, but not limited to, traffic reports, weather, and/or data regarding the primary audio stream.

In step 404, the timeslot allocation module 204 allocates a first timeslot of the plurality of timeslots to a first service to form a grant. The timeslot allocation module 204 may also allocate a second timeslot to a second service. Those skilled in the art will appreciate that the timeslot allocation module 204 may allocate any number of timeslots to any service.

In step 406, the timeslot allocation module 204 generates the GAM that describes the grant and indicates a location of the first timeslot. In various embodiments, the grant allocation message describes one or more grants and indicates one or more locations of one or more timeslots. The GAM may be encoded by OFDM or COFDM.

In steps 408 and 410, a transmitter transmits the GAM and the plurality of timeslots to a receiver. In various embodiments, the transmitter and the receiver are compatible NRSC-5 and NRSC-5A devices.

FIG. 5 depicts the current NRSC-5A transmission standard provision for scheduling multiple audio services in a single P1 logical channel in the prior art. FIG. 5 shows an example of current the allocation of two audio services and one data service in P1 logical channel. The services are denoted as Prog 0 (corresponding to the MPS audio program 0), Prog 1 (corresponding to the SPS audio program 1), and ADS data (corresponding to ADS data service). The layer2 multiplex will assign the services sequentially in the P1 frame, first to Prog 0, then Prog 1, then ADS. The same allocation will be repeated in subsequent L1 transmission frames. With this layer2 service multiplexing, information of each service is sent over each of the L1 transmission frames.

FIG. 6 shows improved scheduling in accordance with an exemplary embodiment. The scheduler 114 may first establish a period for the service scheduling. In this example, the period is 2 L1 transmission frames. The scheduler 114 may then allocate one large grant for each of the services in the period, and repeat that grant in the following period. In the example shown in FIG. 6, Prog 0 is allocated with a grant of size 512 timeslots (a full frame) starting at frame ALFN=K timeslot 0. Prog 1 is allocated with a grant of size 508 timeslots starting at frame ALFN=K+1 timeslot 0. The ADS data service is allocated a grant of size 4 timeslots starting at frame ALFN=K+1 timeslot 508. The scheduler module may repeat these grants at a period of 2 L1 transmission frames. Therefore, every frame with ALFN=K+2*n where n=0, 1, . . . is an integer having the same allocation as frame ALFN=K. Similarly, every frame with ALFN=K+2*n+1 will have the same allocation as frame ALFN=K+1. The same periodic grants can continue until one of the services is dropped, added, or have a change in bit rate. In this scheduling embodiment, information belonging to Prog 0 is carried over every other L1 transmission frame, with ALFN=K+2*n. Information belonging to Prog 1 or the ADS data carries over every other L1 transmission frame, with ALFN=K+2*n+1.

Figure 7:
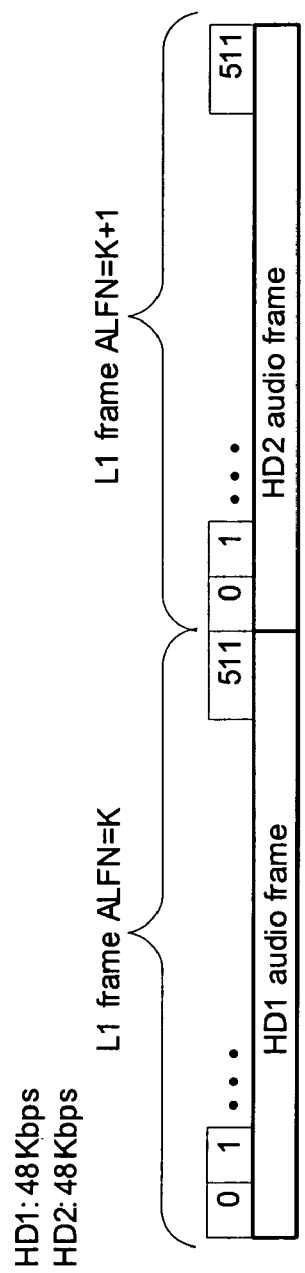
FIG. 7 is a block diagram of L1 transmission frames wherein two audio programs are transmitted in subsequent L1 transmission frames in an exemplary embodiment.

FIG. 7 is a block diagram of L1 transmission frames wherein two audio programs are transmitted in subsequent L1 transmission frames in an exemplary embodiment. In various embodiments, every other L1 transmission frame contains a multicast program HD1 or HD2. For example, 64 packets of MPS may be transmitted in the first L1 transmission frame. Subsequently 64 packets of SPS may be transmitted in the second L1 transmission frame. The odd transmission frames (e.g., the third, fifth, seventh, and so on) may transmit packets of HD1 while the even transmission frames (e.g., fourth, sixth, eighth, and so on) may transmit packets of HD2. In some embodiments, the presence or absence of MPS or SPS may be indicated by L2 PCI bits. The transmission schedule may be broadcast as an ADS packet or by a header extension field in the MPS header or as a new SIS message.

As a result of the transmission of L1 transmission frames in this manner, the radio receiver 106 that receives the L1 transmission frames may selectively deactivate unused components (such as a deinterleaver) thereby saving power. Deactivation of unused components of the radio receiver 106 is further discussed herein. In one example, when the L1 transmission frames are transmitted as depicted in FIG. 7, then the radio receiver 106 may achieve 50% or less power savings.

Figure 8:
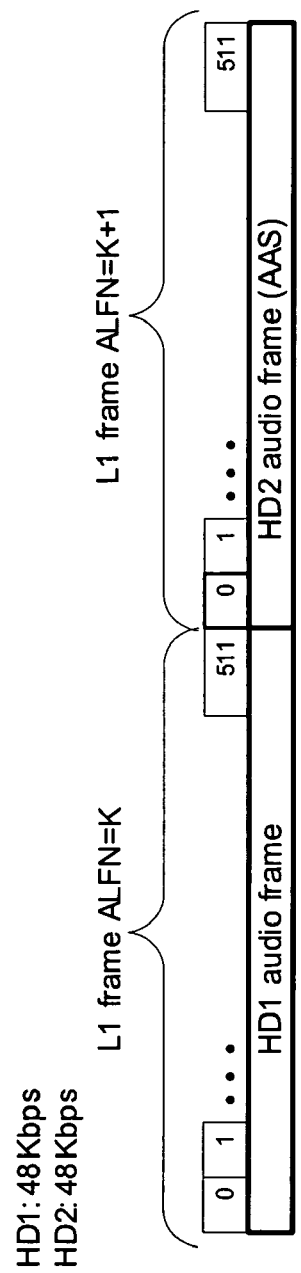
FIG. 8 is another block diagram of L1 transmission frames wherein two audio programs are transmitted in subsequent L1 transmission frames in an exemplary embodiment.

FIG. 8 is another block diagram of L1 transmission frames wherein two audio programs are transmitted in subsequent L1 transmission frames in an exemplary embodiment. In various embodiments, every other L1 transmission frame contains the Main Program Stream. Unlike the format of the L1 transmission frames discussed in FIG. 7, however, the second audio program (SPS) is transmitted as ADS packets. In one example, 64 packets of MPS are transmitted in the first L1 transmission frame. This frame's PCI bits are set to indicate the presence of an MPS/SPS but no fixed data. For the second L1 transmission frame, as well as other L1 transmission frames of SPS transmitted as ADS packets, the PCI bits indicate that the frame contains fixed data but not MPS or SPS. The HDC encoder at the transmitter may be configured such that the 64 compressed packets corresponding to an MPS stream are rate shaped to fit an L1 transmission frame. This sort of rate shaping has been applied to other Audio/Video compression standards. The SPS may not have the same timing alignment requirement that is required of the MPS due to blending considerations. In various embodiments, the same rate shaping may be performed on the SPS to reduce the buffer requirements on the receiver.

As a result of the transmission of L1 transmission frames in this manner, the radio receiver 106 that receives the L1 transmission frames may selectively deactivate unused components (such as the deinterleaver) thereby saving power. In one example, when the L1 transmission frames are transmitted as depicted in FIG. 8, then the radio receiver 106 may achieve 50% or less power savings. Existing receivers can still receive MPS. Further, existing receivers may be able to receive SPS encapsulated in ADS after a software upgrade.

Figure 9:
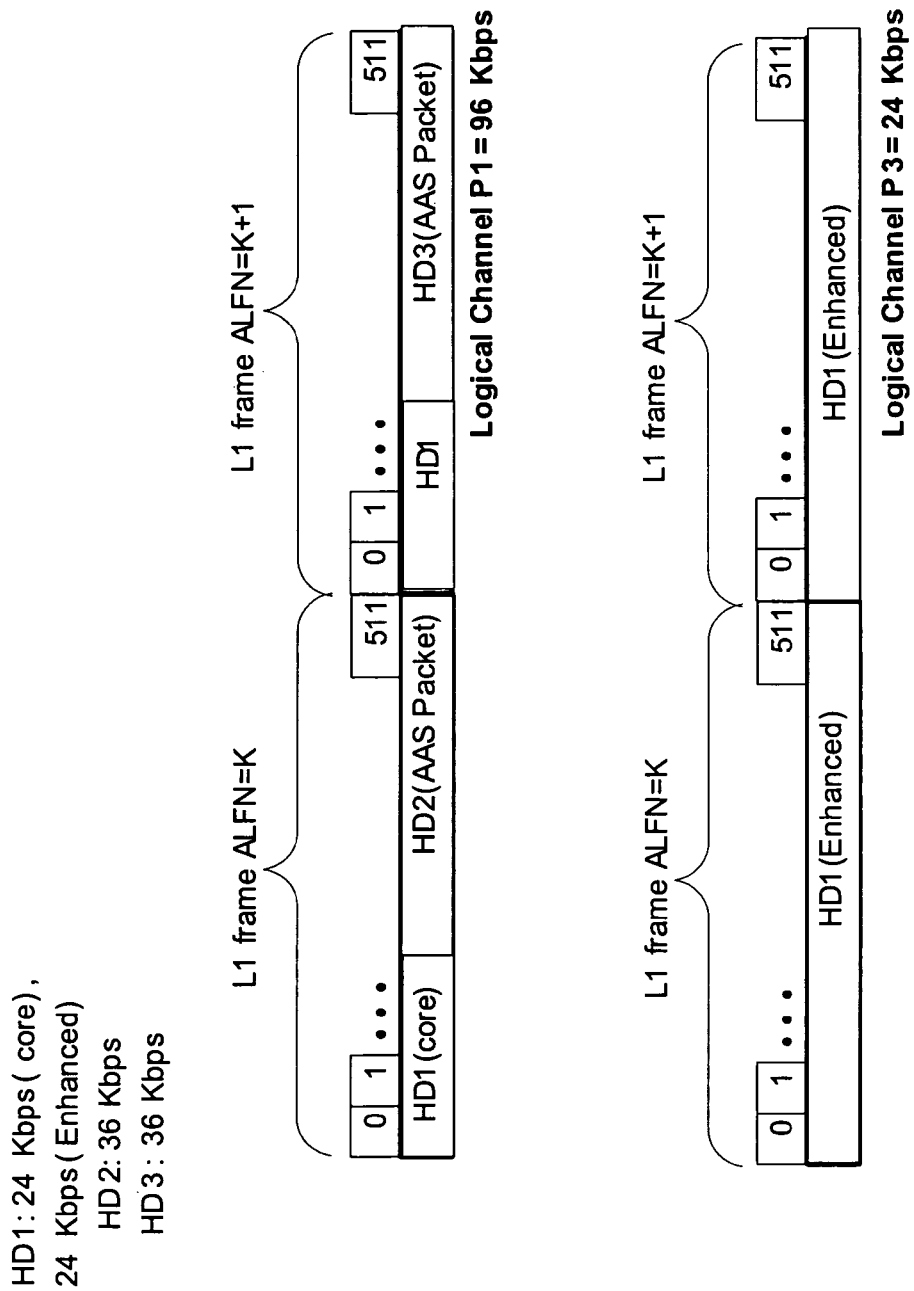
FIG. 9 is a block diagram of multiple logical channels in an exemplary embodiment.

FIG. 9 is a block diagram of multiple logical channels in an exemplary embodiment. A limitation of the previous allocation of bandwidth between MPS and SPS may limit the number of multicast streams to two without degrading the audio quality. One approach to solve this problem would be to use the multi-stream capability of the HDC. The MPS can be split to a core and enhanced stream. The core stream may be transmitted in L1 transmission frames of logical channel P1. The remaining bandwidth of the L1 transmission frames of the logical channel P1 may be used to transmit SPS streams (e.g., HD2 and HD3) as ADS packets. The enhanced stream of the MPS is transmitted in logical channel P3 (Extended Hybrid). This approach allows for three or more multicast streams. It may not be possible to turn off the receiver when the user is listening to the MPS but the SPS streams can be time divisioned to turn off inactive symbols thereby saving power.

In one example, 24 Kbps of the core of HD1 (MPS) is transmitted in L1 transmission frames of the logical channel P1. 36 Kbps of HD2 (SPS) and HD3 (SPS) are also transmitted as ADS packets in L1 transmission frames of the logical channel P1. Further, in logical channel P3, 24 Kbps enhanced stream of the MPS is also transmitted. As a result, in some embodiments, the radio receiver 106 may achieve significant power savings by deactivating radio receiver components when unneeded.

In another example, 32 Kbps of the core of MPS is transmitted in L1 transmission frames of the logical channel P1 as an ADS packet. The remaining 64 Kbps is split to HD2 and HD3 which are also transmitted as ADS packets in L1 transmission frames of the logical channel P1. As a result, in some embodiments, the radio receiver 106 may achieve 50% power savings or less by deactivating radio receiver components when unneeded. Here, the MPS and SPS may both be time divisioned.

In various embodiments, in order for the radio receiver 106 to receive and decode audio data within the MPS, SPS, and ADS streams, the radio receiver 106 is configured to receive and process a message (e.g., GAM) describing the scheduling of these streams. Those skilled in the art will appreciate that there may be many ways to convey or otherwise indicate a transmission schedule to a radio receiver 106. The radio receiver 106 may use this transmission schedule to decode the audio data from within the ADS streams.

In other embodiments, the entire bandwidth of the logical channel P1 transmits audio streams encapsulated as ADS packets. In one example, when HD1 and HD2 are transmitted at 48 Kbps as ADS packets, the radio receiver 106 may achieve 50% power savings or less. In another example, when HD1, HD2, and HD3 are transmitted at 32 Kbps as ADS packets, the radio receiver 106 may achieve 66% power savings or less by deactivating radio receiver components when unneeded. Those skilled in the art will appreciate that the radio receiver 106 may need to be configured to process the audio streams contained within the ADS packets. For example, a message (e.g., GAM) describing the scheduling of the ADS streams may be sent from the radio transmitter 104 to the radio receiver 106 to configure the radio receiver 106.

Figure 10:
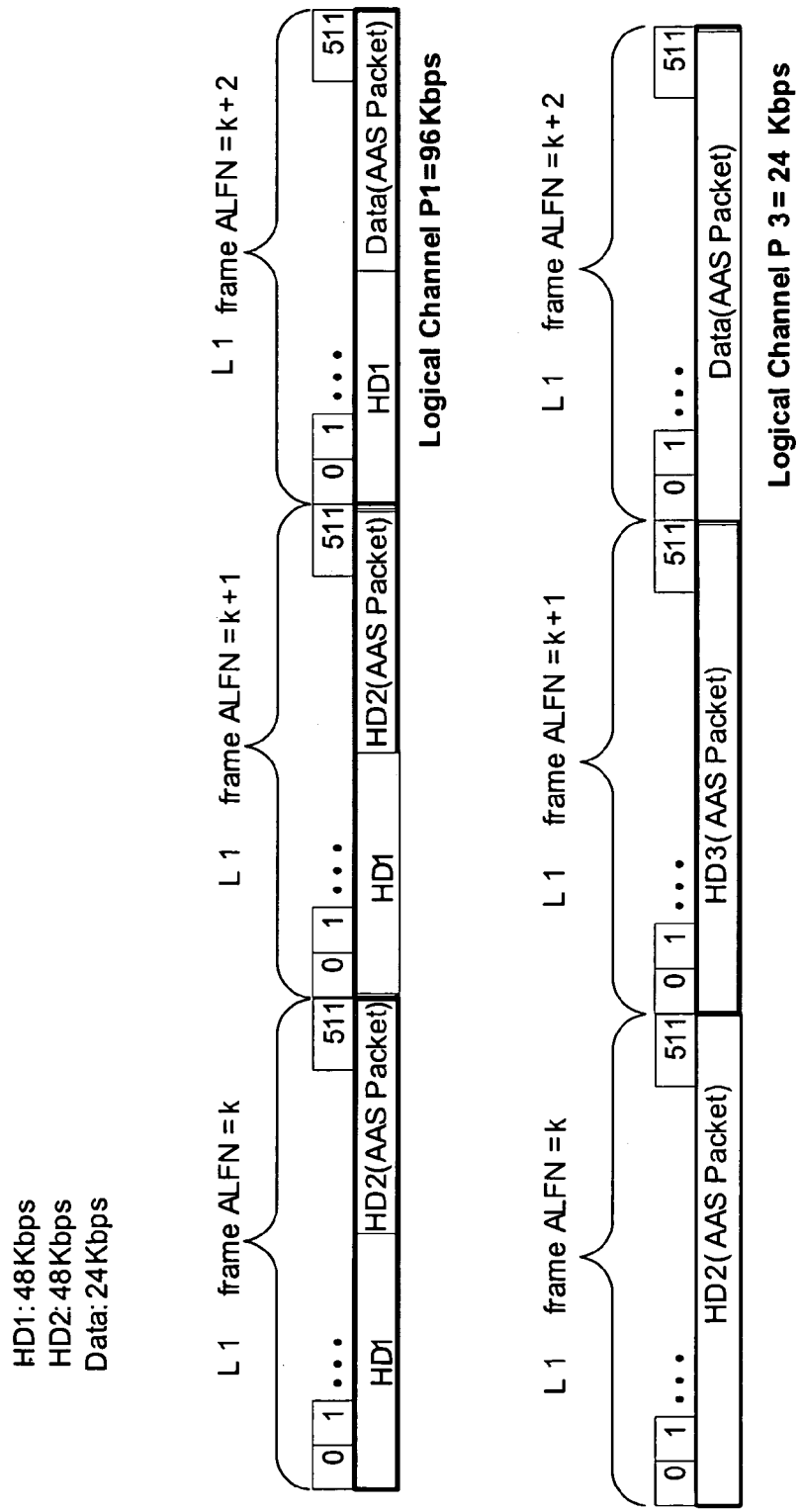
FIG. 10 is another block diagram of multiple logical channels in an exemplary embodiment.

FIG. 10 is another block diagram of multiple logical channels in an exemplary embodiment. In various embodiments, the logical channel P1 (main channel) is virtually concatenated with the logical channel P3 (extended hybrid). The number of frequency partitions in the extended hybrid may determine bandwidth in the logical channel P3, and, hence, the bandwidth of the virtual channel. In various embodiments, the logical channel P1 may use the same or a different channel coding and deinterleaver than that used for logical channel P3. The selection of the deinterleaver scheme for logical channels P1 and P3 may determine the receiver (e.g., of the radio receiver 106) on/off times.

The radio receiver 106 may achieve different power savings depending on the frequency partitions. In one example, as depicted in FIG. 10, the logical channel P1 includes repeating sets of three L1 transmission frames. The first and second L1 transmission frames include HD2 as ADS packets as well as 48 Kbps of HD1 (SPS). The third L1 transmission frame includes data within the ADS packet as well as 48 Kbps of HD1. The logical channel P3 also includes repeating sets of three L1 transmission frames. The first L1 transmission frame includes HD2 as ADS packets. The second L1 transmission frame includes HD3 as ADS packets. The third L1 transmission frame includes data as ADS packets. As a result of this partitioning, the radio receiver 106 may achieve power savings of 33% or less. The convolutional deinterleaver used in logical channel P3 currently specified in the NRSC-5A standard reference documents may need to change to accomplish this.

In another example, the logical channel P1 includes repeating sets of two L1 transmission frames. The first transmission frame includes HD2 as ADS packets as well as 48 Kbps of HD1. The second transmission frame includes HD3 as ADS packets as well as 48 Kbps of HD1. The logical channel P3 also includes repeating sets of two L1 transmission frames. The first L1 transmission frame includes HD2 as ADS packets. The second L1 transmission frame includes HD3 as ADS packets. As a result of this partitioning, the radio receiver 106 may achieve power savings of 50% or less.

Further, in another example, the logical channel P1 includes repeating sets of five L1 transmission frames. The four transmission frames include HD2 as ADS packets as well as 48 Kbps of HD1. The fifth transmission frame includes HD1. The logical channel P3 also includes repeating sets of five L1 transmission frames. The four L1 transmission frame includes HD2 as ADS packets. The fifth L1 transmission frame includes data. As a result of this partitioning, the radio receiver 106 may achieve power savings of 20% or less.

Figure 11:
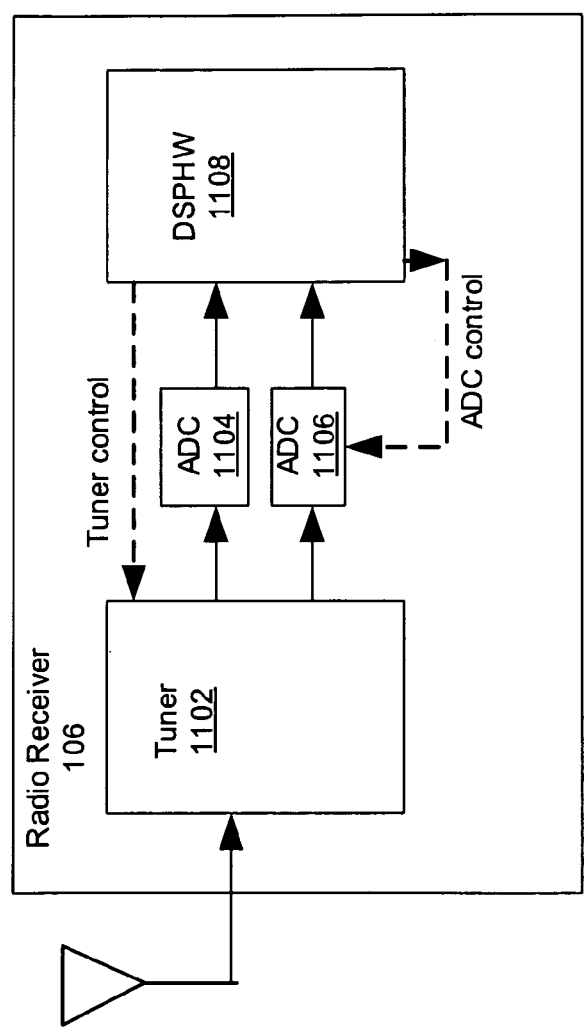
FIG. 11 is a block diagram of a radio receiver in an exemplary embodiment.

FIG. 11 is a block diagram of a radio receiver 106 in an exemplary embodiment. In various embodiments, the radio receiver 106 is capable of receiving and decoding grant allocation messages from the radio transmitter 104. The decoded grant allocation messages may be used to identify OFDM symbols that carry information belonging to services that are used by the radio receiver 106. As a result, the radio receiver 106 may deactivate (e.g., turn off) components during OFDM symbols that do not carry information belonging to services in use by the radio receiver 106 thereby reducing power consumption.

The radio receiver 106 comprises a tuner 1102, two analog to digital converters (ADCs) 1104 and 1106, and digital signal processing hardware (DSPHW) 1108. The tuner 1102 is configured to tune to a desired communication channel transmitted over a specific radio frequency (RF) band, and down-convert it to some intermediate frequency (IF) or to zero frequency (DC). The down-converted signal can then be sampled by the ADCs 1104 and 1106 to form digital representations of the down-converted signal. Although two ADCs 1104 and 1106 are depicted in FIG. 11, those skilled in the art will appreciate that there may be one or more ADCs.

The DSPHW 1108 may be implemented with digital logic circuitry in order to demodulate the sampled signal and recover the information that was modulated in the transmitted signal. The DSPHW 1108 can include a hard wired digital logic, hard programmable digital logic, a programmable processor, or any combination of these.

In various embodiments, the radio receiver 106 may also be configured to include a control line between the DSPHW 1108 and the ADC 1106, and another control line between the DSPHW 1108 and the tuner 1102. The DSPHW 1108 is capable of controlling the tuner 1102 and the ADC 1106 for tuning and sampling the desired channel. The DSPHW 1108 is also capable of controlling the power consumption of a tuner 1102 by controlling the power consumption of one or more of the components inside the tuner 1102.

In some embodiments, the DSPHW 1108 can completely turn off (i.e., deactivate) the current consumption of some of the components of the tuner 1102. In one example, the DSPHW 1108 sets one or more tuner 1102 components to a power off mode. The DSPHW 1108 may also reduce the power consumption of some of the tuner components, but not completely eliminate the currents to these components, setting them into power standby mode. Similarly, the DSPHW 1108 can control the power consumption of the ADC 1106, by setting the ADC 1106 to power off or standby mode. The DSPHW 1108 is also capable of controlling the power consumption of the DSPHW 1108 itself, by clock gating clocks into some of the digital circuits of the DSPHW 1108.

Although FIG. 11 depicts a single control line between the DSPHW 1108 and the ADC 1106, in various embodiments the radio receiver 106 may be configured such that there are any number of control lines between the DSPHW 1108 and the ADCs. For example, the radio receiver 106 may include a control line between the DSPHW 1108 and the ADC 1104 as well as between the DSPHW 1108 and the ADC 1106. As a result, the DSPHW 1108 may independently control power consumption in each ADC. In other embodiments, there may be no control line(s) between the DSPHW 1108 and any of the ADCs.

Figure 12:
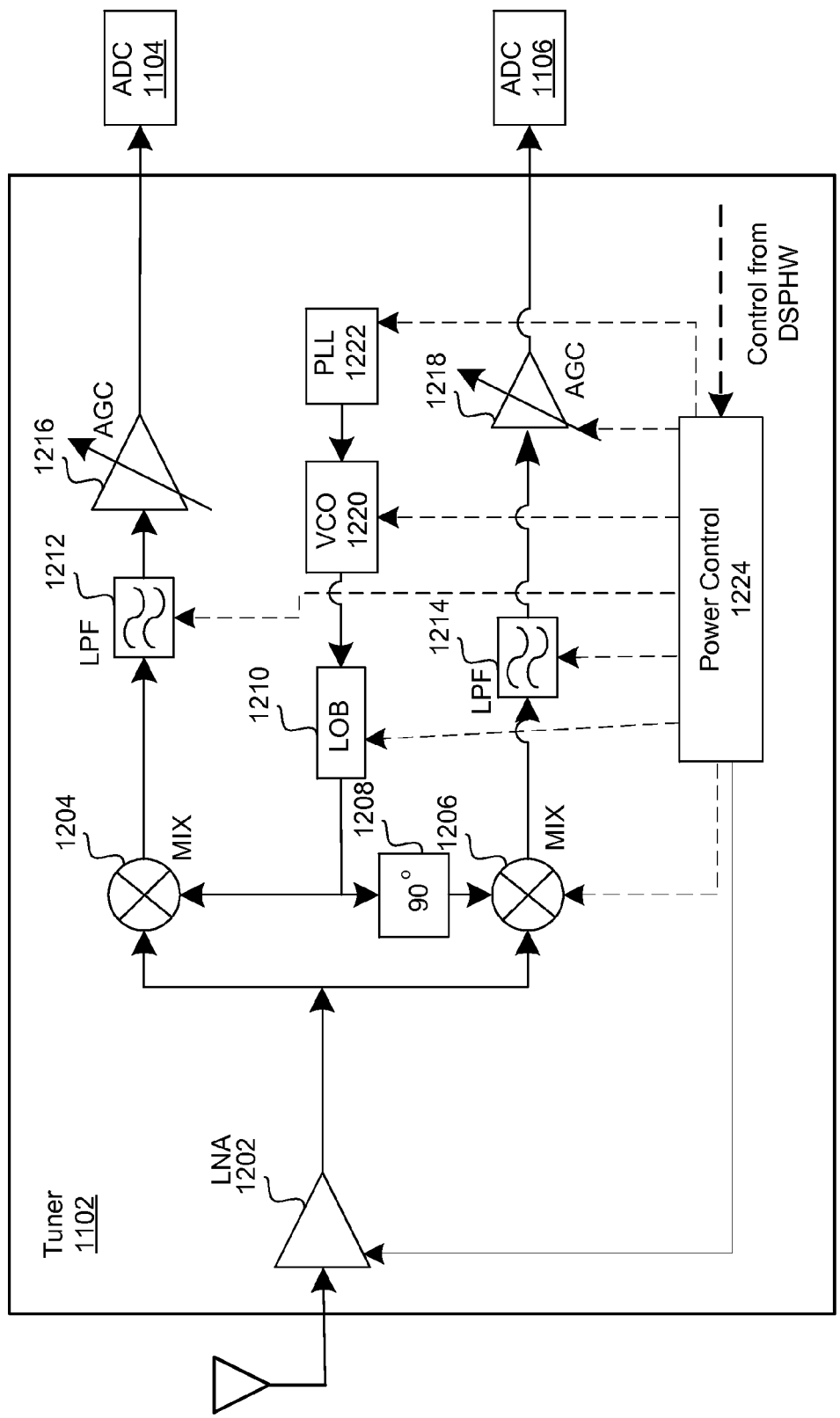
FIG. 12 is a block diagram of an exemplary tuner with a direct conversion architecture in an exemplary embodiment.

FIG. 12 is a block diagram of an exemplary tuner 1102 with a direct conversion architecture in an exemplary embodiment. The tuner 1102 comprises components including a low noise amplifier (LNA) 1202, mixers (MIX) 1204 and 1206, shifter 1208, local oscillator buffer (LOB) 1210, low pass filters (LPFs) 1212 and 1214, automatic gain controls (AGCs) 1216 and 1218, a voltage controlled oscillator (VCO) 1220, a phase lock loop (PLL) 1222, and a power control 1224.

In various embodiments, a radio frequency signal is received by the antenna of the radio receiver 106. The signal is first amplified by the LNA 1202. The signal is then split into two branches, including an inphase branch and a quadrature phase branch. The signal in the inphase branch may be mixed in MIX 1204 with a sinusoid, and the signal on the quadrature branch may be mixed in MIX 1206 with a sinusoid shifted by 90 degrees (via shifter 1208) to produce a replica of the signal centered on a low intermediate frequency (IF) or centered on zero frequency (DC). The down-converted signals_are then passed through LPFs 1212 and 1214, respectively, which reject signals that are outside the band of the signal of interest. AGCs' 1216 and 1218 circuitry may adjust the power of the filtered signals to a desired level. The outputs of the AGCs 1216 and 1218 are sent to the ADCs 504 and 506, respectively, for sampling.

Optionally, the sinusoidal signal received by the MIXs 1204 and 1206 may be initially generated by the PLL 1222. In one example, the PLL 1222 generates a signal and provides the signal to a voltage controlled oscillator (VCO) 1220 which then provides the signal to a local oscillator buffer (LOB) 1210. The resulting sinusoidal signal is then split. The MIX 1204 subsequently receives the sinusoidal signal. A shifter 1208 shifts the split sinusoidal signal by ninety degrees, and then provides the shifted sinusoidal signal to the MIX 1206. Those skilled in the art will appreciate that there are many ways to generate a sinusoidal signal.

The radio receiver 106 may also implement power control circuitry that can reduce the power consumption of some or all of the components in the tuner 1102. In some embodiments, the currents received by one or more components can be turned off, thereby setting the component(s) to power off mode, or, alternately, the currents can be reduced, thereby setting the component(s) into power standby mode. The power control circuitry may be controlled by the DSPHW 1108 using one or more control lines leading to power control 1224.

In some embodiments, the current to the tuner 1102 can be significantly reduced by setting components to power off or standby mode while still maintaining the phase of a local oscillator carrier generated by the PLL 1222. Those skilled in the art will appreciate that there may be many methods for power control in the tuner 1102 using embodiments described herein. Further, it should be understood by one skilled in the art that various embodiments described herein can be used in any other tuner architecture, such as dual conversion or super heterodyne.

In various embodiments, the radio receiver 106 is capable of synchronizing to a common timeline established with the transmission system 102, where the common timeline is partitioned into a sequence of timeslots. The radio receiver 106 may be capable of determining a start time of each timeslot as it is received.

As discussed herein, the common timeline may be defined by coarse time intervals, which are then further divided into fine timeslots. The coarse time intervals may be set by the ALFN and the fine timeslots may be aligned to the OFDM symbol numbers that carry the data in the L1 transmission frame. During the channel synchronization process, the DSPHW 1108 may synchronize to the L1 transmission frame boundary (e.g., by synchronizing to a system control channel (SCCH)). The DSPHW 1108 may keep a fine timeslot counter that is set to 0 on the first OFDM symbol in the L1 transmission frame, and which may be incremented by one after an interval of OFDM symbol duration. The counter may be reset to 0 at the start of each L1 transmission frame. The radio receiver 106 may also parse station information service (SIS) packets to extract the ALFN number of the received L1 transmission frame. The combination of ALFN number and the fine interval count within each L1 transmission frame may uniquely identify each timeslot interval on the common timeline.

In various embodiments, the radio receiver 106 is also capable of receiving, decoding, and parsing GAM sent from the transmission system 102. In one example, a GAM is transmitted on a PIDS channel as a sequence of SIS messages. The radio receiver 106 may decode the SIS messages in each logical channel to retrieve the GAM body.

In another example, the GAM is transmitted on a dedicated port on an ADS data stream. In this example, the radio receiver 106 may demodulate the L1 transmission frames, extract the ADS packets, and then parse the packets having a port number associated with the GAM to retrieve the GAM body.

After retrieving the GAM, the radio receiver 106 may check a service ID field in the GAM to identify GAMs that describe grant allocations for services that are being used by the radio receiver 106 or by any other device coupled to the radio receiver 106 that receives data from the radio receiver 106. The radio receiver 106 may then retrieve the grant allocation information, thereby identifying which timeslots belonging to different services including those that may be in use by the radio receiver 106.

After identifying the allocated timeslots from the GAM, the DSPHW 1108 may calculate which OFDM symbols are needed to be received and demodulated in order to retrieve the information that belongs to the services used by the radio receiver 106. The required OFDM symbols may be denoted as active symbols. The OFDM that are not active symbols are denoted as inactive symbols.

To calculate the active symbols, the DSPHW 1108 may take into consideration the time interleaving that is performed at the transmission system 102. The interleaving operation of the transmission spreads the information of each timeslot at the input of layer1 into a plurality of transmitted OFDM symbols. The DSPHW 1108 may map the granted timeslots into an equal or greater number of active OFDM symbols that are carrying information belonging to the services in use.

The mapping of granted timeslots to active symbols calculation may depend on a type of interleaver used by Layer 1. Each interleaver may require a different type of mapping function in the DSPHW 1108.

Figure 13:
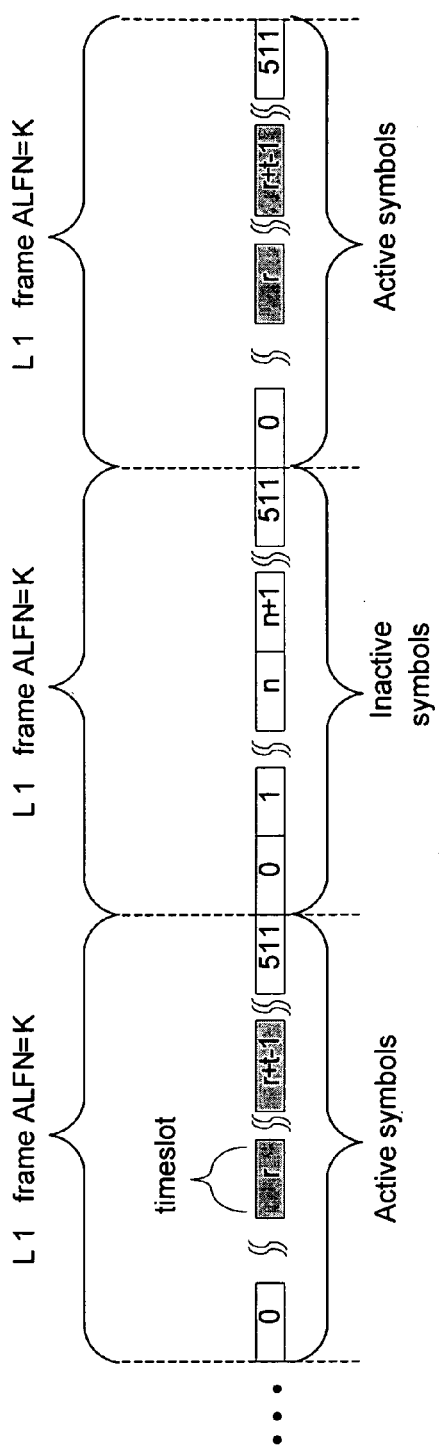
FIG. 13 shows a mapping grants into active symbols in an FM logical channel that is interleaved using interleaver I with latency of M OFDM symbols in an exemplary embodiment.

FIG. 13 shows mapping grants into active symbols in an FM logical channel that is interleaved using interleaver I with latency of M OFDM symbols in an exemplary embodiment. In such a logical channel, the active symbols are all the OFDM symbols belonging to any used interleaver block, where a used interleaver block is comprised of M OFDM symbols that are interleaved together and carry one or more timeslots belonging to a service in use. As shown, the modulation profile is MP1, MP2, or MP3 and the logical channel is P1. The interleaver latency is M=512 OFDM symbols, aligned to an L1 transmission frame. An L1 transmission frame with ALFN=K has a grant of t timeslots, from timeslot r until timeslot r+t−1, (highlighted with gray shading). The active symbols are an entire P1 frame corresponding with ALFN=K, composed of 512 OFDM symbols. In L1 transmission frame numbered ALFN=K+1 there are no granted timeslots, therefore the entire P1 frame of 512 OFDM symbols are inactive symbols.

Figure 14:
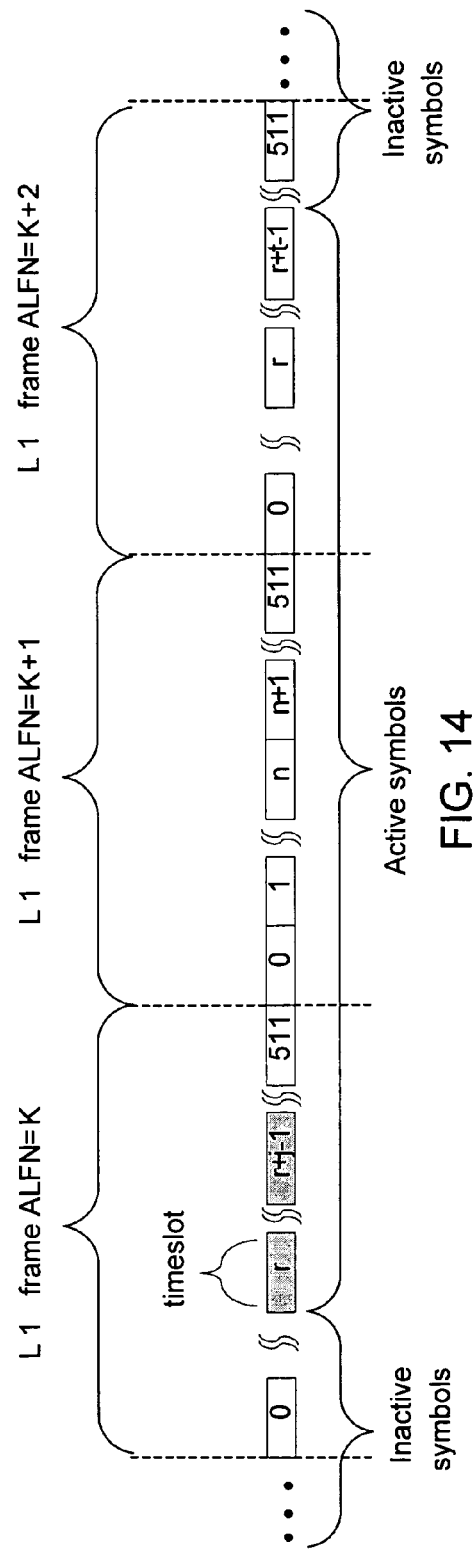
FIG. 14 shows mapping grants into active symbols in a FM logical channel that is interleaved using interleaver IV with latency of K OFDM symbols in an exemplary embodiment.

FIG. 14 shows mapping grants into active symbols in an FM logical channel that is interleaved using interleaver IV with latency of K OFDM symbols in an exemplary embodiment. In such a logical channel, the active symbols are all the OFDM symbols aligned with the grant timeslots themselves followed by additional K OFDM symbols. As shown, a modulation profile can be MP2, MP3 and the logical channel may be P3. The interleaver latency is K=1024 OFDM symbols. FIG. 14 shows a grant of j timeslots, from timeslot r until timeslot r+j−1 in L1 transmission frame ALFN=K, (highlighted with gray shading). The active symbols are ranging from timeslot r in L1 transmission frame ALFN=K until timeslot r+j−1 in ALFN=K+2.

After determining which of the received OFDM symbols are active or inactive, the DSPHW 1108 may send power control signals to one or more components of the tuner 1102, the ADC 1104, ADC 1106, and/or digital hardware components. During the active symbols, the control signals may set the different components into power on mode, thereby allowing the receiving and demodulating of active symbols and extracting the information bits belonging to a service in use. During the inactive symbols, the control signals may set the different components into power down or standby mode, thereby reducing the power consumption of the receiver during the inactive symbols.

In various embodiments, some components may be set to power down mode, some components may be set to standby mode, while others may be active. In one example, certain components may be left in the previous state (e.g., in power down mode) if one or more GAMs indicate a service that is not in use. In another example, the DSPHW 1108 may anticipate a service that will be active based one or more GAMS. The DSPHW 1108 may set one or more components to power on mode from power down mode to allow one or more components time to function correctly (e.g., allow the components to "warm up").

Figure 15:
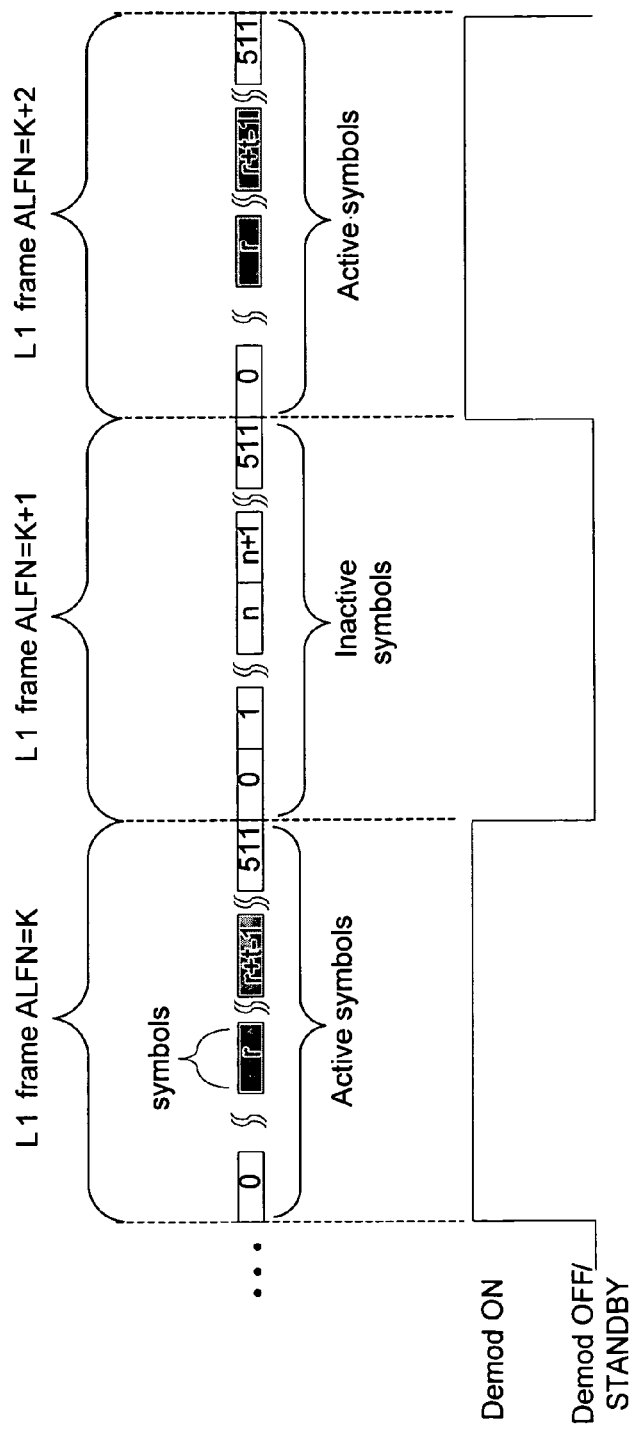
FIG. 15 shows a received transmission partitioned into a sequence of OFDM symbols in L1 transmission frames in an exemplary embodiment.

FIG. 15 shows a received transmission partitioned into a sequence of OFDM symbols (e.g., numbered 0 to 511) in L1 transmission frames in an exemplary embodiment. In various embodiments, the radio receiver 106 is informed by a GAM that a service in use is allocated in periodic grant of t timeslots, from timeslot r until timeslot r+t−1, where the timeslots are aligned to OFDM symbols. The DSPHW 1108 may then identify the active symbols for receiving the service in use. In this example, the active symbols are all the OFDM symbols belonging to L1 transmission frames that carry the grant timeslots before the Layer 1 interleaving operation.

The DSPHW 1108 may then send one or more control signals to one or more components of the tuner 1102, the ADC 1104, ADC 1106, and/or digital hardware components, turning them on (i.e., activating the components) for the duration of the active symbols, and turning them to power down or standby mode for the duration of the inactive symbols. Therefore, the power consumption of the radio receiver 106 component(s) may be reduced during the inactive symbols. The average power consumption of the receiver may, therefore, also be reduced.

In various embodiments, the radio receiver 106 may tune and demodulate a secondary channel during an interval of consecutive inactive timeslots. The secondary channel may be transmitted over a different frequency than the primary channel. The secondary channel may also carry a different kind of communication signal than the primary channel.

During an interval of inactive timeslots, the DSPHW 1108 may configure the tuner 1102 to tune to the secondary channel carrier frequency. The DSPHW 1108 may then demodulate and decode the digital data transmitted over the secondary channel, until the end of the inactive timeslots interval, or until sufficient data is collected from the secondary channel.

In some embodiments, the primary channel is a hybrid FM signal and the secondary channel is another hybrid FM on a different carrier frequency. In other embodiments, the primary channel is a hybrid FM signal and the secondary channel is an analog FM signal, carrying a DirectBand digital signal. Any combination of primary and secondary channel types may be utilized in embodiments discussed herein.

Figure 16:
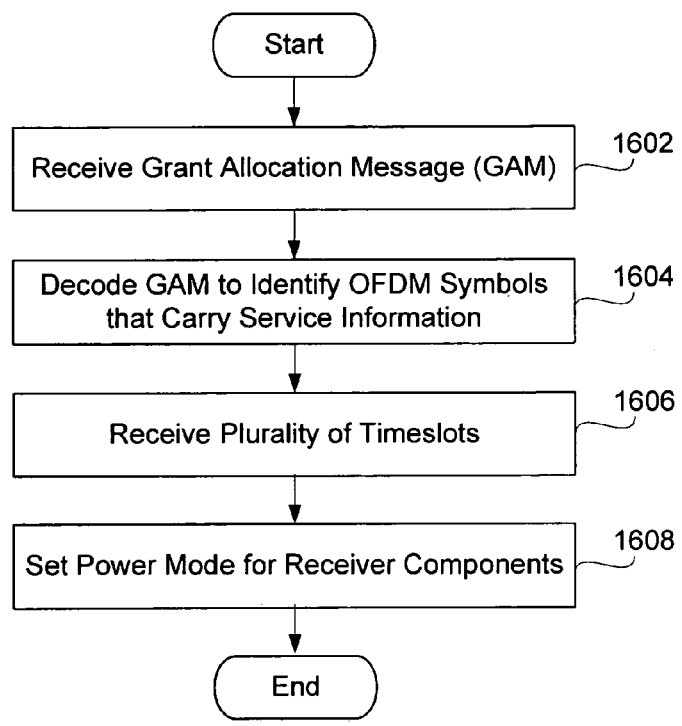
FIG. 16 is a flowchart regarding receiving the grant allocation message in an exemplary embodiment.

FIG. 16 is a flowchart regarding receiving the grant allocation message in an exemplary embodiment. In step 1602, the radio receiver 106 receives a grant allocation message describing a first service and a location of a timeslot from a transmitter such as a radio transmitter 104. In step 1604, the radio receiver 106 decodes the GAM to identify OFDM symbols that carry service information (i.e., information regarding one or more services). The radio receiver 106 may also parse, format, or unformat the GAM to retrieve desired information.

In step 1606, the radio receiver 106 receives a plurality of timeslots, including the timeslot referred to within the GAM. After processing one or more of the plurality of timeslots, the radio receiver 106 sets a power mode for receiver components. In one example, the radio receiver 106 sets one or more components of the tuner to power down or standby mode. The radio receiver 106 may also set one or more other components to power on mode (i.e., activate). Those components that are active may be necessary for the radio receiver 106 to perform desired services associated with one or more timeslots within the plurality of timeslots. Similarly, those components that are in power down or standby mode may not be used within one or more timeslots within the plurality of timeslots.

The above-described functions and components can be comprised of instructions that are stored on a computer readable storage medium. The instructions can be retrieved and executed by a processor. Some examples of instructions are software, program code, and firmware. Some examples of computer readable storage medium are memory devices, tape, disks, integrated circuits, and servers. The instructions are operational when executed by the processor to direct the processor to operate in accord with embodiments of the present invention. Those skilled in the art are familiar with instructions, processor(s), and computer readable storage medium.

The present invention has been described above with reference to exemplary embodiments. It will be apparent to those skilled in the art that various modifications may be made and other embodiments may be used without departing from the broader scope of the invention. Therefore, these and other variations upon the exemplary embodiments are intended to be covered by the present invention.

What is claimed is:

1. A method comprising:
dividing a stream of data into a plurality of timeslots;
allocating a first timeslot of the plurality of timeslots to a first service;
generating a grant allocation message that indicates a location of the first timeslot allocated to the first service;
transmitting the grant allocation message to a receiver; and
transmitting the plurality of timeslots to the receiver,
wherein the receiver selectively deactivates unused components of the receiver based at least in part on one or more of the plurality of timeslots.

2. The method of claim 1, wherein the stream of data comprises audio.

3. The method of claim 1, wherein allocating the first timeslot to the first service comprises creating gaps between timeslots that are allocated to data from similar services.

4. The method of claim 1, further comprising encoding the grant allocation message by OFDM.

5. The method of claim 1, wherein the plurality of timeslots comprises AAS packets.

6. The method of claim 1, wherein transmitting the grant allocation message to a receiver comprises transmitting the grant allocation message on a dedicated port on an AAS data stream.

7. A system comprising:
a transmission system configured to divide a stream of data into a plurality of timeslots, to allocate a first timeslot of the plurality of timeslots to a first service, and generate a grant allocation message that indicates a location of the first timeslot allocated to the first service;
a transmitter configured to transmit the grant allocation message and the plurality of timeslots to a receiver; and
the receiver configured to selectively deactivate unused components of the receiver based at least in part on one or more of the plurality of timeslots.

8. The system of claim 7, wherein the timeslot allocation module is further configured to encode the grant allocation message by OFDM.

9. The system of claim 7, wherein the transmission system is further configured to create gaps between timeslots within the plurality of timeslots that are allocated to data from similar services.

10. A method comprising:
receiving a grant allocation message;
decoding the grant allocation message to identify OFDM symbols that carry information regarding a first service;
receiving a plurality of timeslots;
setting a power mode of a component during OFDM symbols that indicate a status of the first service; and
selectively deactivating unused components of the receiver based at least in part on one or more of the plurality of timeslots.

11. The method of claim 10, wherein the status of the service indicates that a service is active.

12. The method of claim 11, wherein setting the power mode of the component comprises activating the component.

13. The method of claim 10, wherein setting the power mode of the component comprises setting the component to a power down mode when there is no indication that a second service is active.

14. The method of claim 10, wherein setting the power mode of the component comprises setting the component to a power standby mode when there is no indication that a second service is active.

15. The method of claim 10, further comprising parsing the grant allocation message.

16. A receiver comprising:
a tuner configured to receive a grant allocation message and a plurality of timeslots; and
digital signal processing hardware configured to decode the grant allocation message to identify OFDM symbols that carry information regarding a first service, set a power mode of a component of the tuner during OFDM symbols that indicate a status of the first service, and send power control signals to at least one component of the tuner, one or more analog to digital converters (ADCs), and digital hardware.

17. The receiver of claim 16, wherein the digital signal processing hardware configured to set the power mode comprises the digital signal processing hardware configured to set the power mode of the component to a power down mode when there is no indication that a second service is active.

18. The receiver of claim 16, wherein the digital signal processing hardware configured to set the power mode comprises the digital signal processing hardware configured to set the power mode of the component to a power standby mode when there is no indication that a second service is active.

19. The receiver of claim 16, wherein the digital signal processing hardware configured to set the power mode comprises the digital signal processing hardware configured to set the power mode of the component to a power on mode prior to OFDM symbols that indicate the status of the first device is active.

* * * * *